US012647331B2

(12) United States Patent
Banks et al.

(10) Patent No.: US 12,647,331 B2
(45) Date of Patent: Jun. 2, 2026

(54) MEASURING AND ENFORCING API USAGE IN A MULTI-TENANT COMPUTING ENVIRONMENT

(71) Applicant: WORKDAY, INC., Pleasanton, CA (US)

(72) Inventors: Matthew Banks, Livermore, CA (US); Niall Tierney, Dublin (IE)

(73) Assignee: WORKDAY, INC., Pleasanton, CA (US)

( * ) Notice: Subject to any disclaimer, the term of this patent is extended or adjusted under 35 U.S.C. 154(b) by 20 days.

(21) Appl. No.: 18/793,140

(22) Filed: Aug. 2, 2024

(65) Prior Publication Data

US 2026/0039566 A1     Feb. 5, 2026

(51) Int. Cl.
H04L 41/5009 (2022.01)
H04L 9/40 (2022.01)
H04L 67/02 (2022.01)

(52) U.S. Cl.
CPC .......... H04L 41/5009 (2013.01); H04L 63/08 (2013.01); H04L 67/02 (2013.01)

(58) Field of Classification Search
CPC ...... H04L 41/5009; H04L 63/08; H04L 67/02
See application file for complete search history.

(56) References Cited

U.S. PATENT DOCUMENTS

| | | | |
|---|---|---|---|
| 10,148,493 B1 * | 12/2018 | Ennis, Jr. ................ | G06F 9/541 |
| 10,552,442 B1 * | 2/2020 | Lusk ........................ | G06F 21/62 |
| 11,570,182 B1 * | 1/2023 | Tran .................... | G06F 21/6227 |
| 2017/0171245 A1 * | 6/2017 | Lee ........................ | G06F 16/958 |
| 2020/0052957 A1 * | 2/2020 | Tubillara ................ | H04L 67/10 |
| 2020/0174842 A1 * | 6/2020 | Wang ........................ | H04L 67/63 |
| 2023/0104787 A1 * | 4/2023 | Hassan ................. | G06F 9/5061 |
| | | | 718/104 |
| 2023/0124166 A1 * | 4/2023 | Mohanty ................ | G06N 20/20 |
| | | | 726/22 |
| 2023/0176918 A1 * | 6/2023 | Aronovich ............ | G06F 9/5038 |
| | | | 718/103 |
| 2023/0300135 A1 * | 9/2023 | Krishnan ................ | G06F 9/541 |
| | | | 726/4 |
| 2023/0367608 A1 * | 11/2023 | Ross .................... | G06F 9/44505 |

* cited by examiner

*Primary Examiner* — El Hadji M Sall
(74) *Attorney, Agent, or Firm* — James J. DeCarlo; Greenberg Traurig, LLP

(57) ABSTRACT

In some implementations, the techniques described herein relate to a method including: receiving, at an API gateway, an API request from an API client; extracting, by the API gateway, a client identity associated with the API request; checking, by the API gateway, API Level Objectives (ALOs) associated with the client identity, the ALOs defining acceptable usage limits for the client identity; determining, by the API gateway, that the API request falls outside the acceptable usage limits defined by the ALOs; and applying, by the API gateway, an API Level Agreement (ALA) action, the ALA action specifying an action to be taken when an ALO is breached.

20 Claims, 5 Drawing Sheets

MEASURING AND ENFORCING API USAGE IN A MULTI-TENANT COMPUTING ENVIRONMENT

BACKGROUND

Many computing systems provide one or more application programming interface (APIs) to allow other computing devices to retrieve and modify data. Most APIs take the form of a receiver that receives calls to an API endpoint from the other computing devices. Since these other computing devices independently access APIs, the computer system providing the API must itself manage connections thereto.

DETAILED DESCRIPTION

The disclosure is directed toward the field of application programming interface (API) management and, in particular, to techniques for defining, measuring, and enforcing API usage policies in a multi-tenant environment.

Modern software systems frequently expose their functionality through APIs, allowing multiple clients to interact concurrently. In such systems, it is desirable to manage and control API usage to ensure fair resource allocation, maintain optimum or near-optimum system performance, and prevent abuse. However, existing approaches to API management often rely on static, one-size-fits-all policies that fail to account for the diverse needs and usage patterns of different clients and tenants.

The example embodiments describe API Level Objectives (ALOs) that enable fine-grained measurement and enforcement of API usage policies. ALOs allow system administrators to define specific metrics and thresholds for API consumption, such as request throughput, response bandwidth, and error rates. Administrators or other users can dynamically adjust these objectives based on factors such as the client's identity, the API endpoint being accessed, the overall system load, and other factors.

Through ALOs, the disclosure provides a flexible and scalable solution for managing API usage in computing environments, such as multi-tenant environments. The example embodiments ensure that each tenant receives a fair share of system resources while maintaining optimal performance and preventing excessive or abusive API consumption. The example embodiments address the limitations of existing approaches and offer a more granular and adaptive approach to API management.

Figure 1:
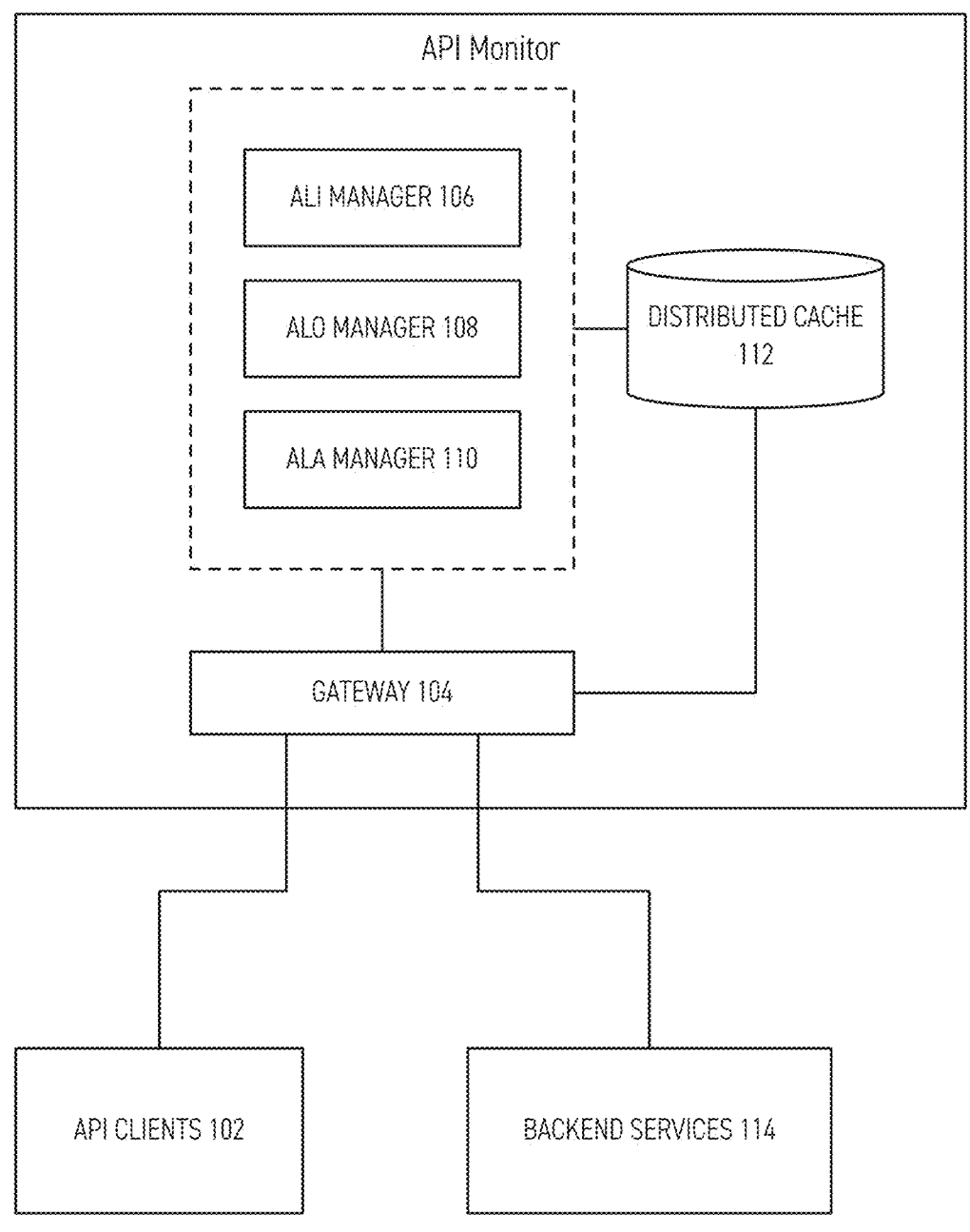
FIG. 1 shows an architectural diagram of a system for managing and enforcing API usage policies according to some of the disclosed embodiments.

FIG. 1 shows an architectural diagram of a system for managing and enforcing API usage policies using API Level Indicators (ALIs), API Level Objectives (ALOs), and API Level Agreements (ALAs).

As illustrated, the system includes API clients 102, a gateway 104, a distributed cache 112, an ALO manager 108, an ALI manager 106, an ALA manager 110, and backend services 114. In some implementations, the backend services 114 may be implemented as instances of an API that can be scaled and deployed as necessary.

The API clients 102 represent entities that consume the APIs, including internal users, partners, and external customers. These clients send API requests to the gateway 104, which acts as the entry point for API traffic. In general, API clients 102 may comprise any computing device that can issue network requests to the API and the disclosure is not limited in the types of devices that can issue such requests.

The gateway 104 proxies incoming API requests to the backend services 114. The gateway 104 performs tasks such as authentication, authorization, rate limiting, and request/response transformation before forwarding requests to the backend. In some implementations, gateway 104 can include or communicate with an application server. The gateway 104 can enforce authentication and authorization policies to ensure that only authorized API clients can access the APIs. It can integrate with identity providers and access control systems to validate client credentials and permissions. The gateway 104 can implement security measures such as SSL/TLS encryption, IP whitelisting, and rate limiting.

In some implementations, the gateway 104 collects and manages API usage data. It interacts with the ALI manager 106, ALO manager 108, and ALA manager 110. These components define, measure, and enforce API usage policies as will be discussed in further detail herein. In some implementations, gateway 104 can act as an entry point for API requests and determine if API requests should be forwarded to an appropriate application server (e.g. backend services 114). In this scenario, gateway 104 can be used to augment an existing API system without modifying the API endpoint or client software development kits. The gateway 104 can emit logs and metrics related to API usage, policy enforcement, and system health. These logs and metrics can be aggregated and analyzed using monitoring and logging solutions, enabling administrators to detect anomalies, troubleshoot issues, and optimize the system.

The ALI manager 106 defines and tracks ALIs. In some implementations, ALIs comprise metrics that measure aspects of API consumption, including, without limitation, request throughput, response bandwidth, error rates, and latency. The ALI manager 106 receives metric data from the gateway 104 and stores the ALIs in a distributed cache 112.

The ALO manager 108 defines and manages ALOs. In some implementations, ALOs specify target values or acceptable ranges for each ALI. For example, if an ALI is an error rate, a corresponding ALO may be a threshold of 5%. Similarly, if an ALI is a response bandwidth, a corresponding ALO may be a preset size (e.g., 5 MB per preset time interval, e.g., one minute). In some implementations, the ALO manager 108 receives ALOs from the manager of the API. In other implementations, the ALO manager 108 can predictively and/or dynamically set the ALOs for a given API based on monitoring the health of the API and determining which ALOs will result in a healthy API.

The ALA manager 110 defines and enforces ALAs, which specify actions to be taken when an ALO is breached. The ALA manager 110 receives breach data from the gateway 104 and stores the ALAs in the distributed cache 112. For example, if an ALI is response bandwidth and an ALO is 5 MB for every minute interval, the corresponding ALA may implement a temporary block on further requests from the client once the response bandwidth ALO is breached. This approach aims to address inefficient client patterns, such as frequent polling that returns large amounts of redundant data (e.g., repeatedly fetching the same purchase order attachments). In some implementations, the block can be enforced for a rolling one-minute interval, during which the gateway would protect the API server by rejecting subsequent requests. The client can be informed of this temporary restriction through a standard HTTP header (e.g., retry-after), providing an indication of when they can resume making requests. In some implementations, this ALA encourages clients to optimize their data retrieval patterns, potentially by using more fine-grained time intervals in their requests to reduce unnecessary data transfer and server load.

In some implementations, the ALI manager 106, ALO manager 108, and ALA manager 110 can expose APIs or user interfaces for managing and configuring policies, allowing administrators or API owners to define, update, and delete policies programmatically or through a web-based console. The policies can be versioned and audited.

The distributed cache 112 serves as shared storage for ALIs, ALOs, and ALAs. It enables fast access to these policies by the gateway 104. The gateway 104 reads the ALIs, ALOs, and ALAs from the distributed cache 112 and uses them to make policy decisions. It checks API requests against the policies and takes actions based on the ALAs. These actions can include allowing, throttling, or rejecting requests. The gateway 104 sends API responses back to the API clients 102 as impacted by any applicable ALA actions.

The backend services 114 receive proxied requests from the gateway 104, process them, and send responses back to the gateway 104, which forwards them to the API clients 102.

In some implementations, the system allows for management of API usage policies. The ALI manager 106, ALO manager 108, and ALA manager 110 can be updated without affecting the operations of the gateway 104, enabling the system to adapt to changing API consumption patterns and business requirements. In some implementations, the distributed cache 112 ensures performance and scalability by minimizing latency introduced by policy evaluation and enforcement, as the gateway 104 can quickly access the necessary information.

The system can define multiple sets of ALIs, ALOs, and ALAs to handle different types of API clients 102 and APIs. The gateway 104 can match incoming requests against these policies and apply appropriate actions.

The modular architecture enables integration with existing systems and tools. The gateway 104 can be extended to support additional functionality, such as API analytics, billing, or security features. The ALI manager 106, ALO manager 108, and ALA manager 110 can be integrated with external monitoring and alerting systems.

The components of the system can be scaled independently based on workload and performance requirements. The gateway 104 can be horizontally scaled to handle increased API traffic, while the backend services can be scaled based on their specific resource needs. In some implementations, the distributed cache 112 can be replicated across multiple nodes.

The communication between the components can be implemented using various protocols and technologies, such as HTTP/REST, gRPC, or message queues, depending on factors such as performance, interoperability, and existing infrastructure.

The architecture in FIG. 1 provides a solution for managing and enforcing API usage policies. It offers control over API consumption while ensuring performance and maintainability. Specific functional details of the above system are now described with respect to the following figures.

Figure 2:
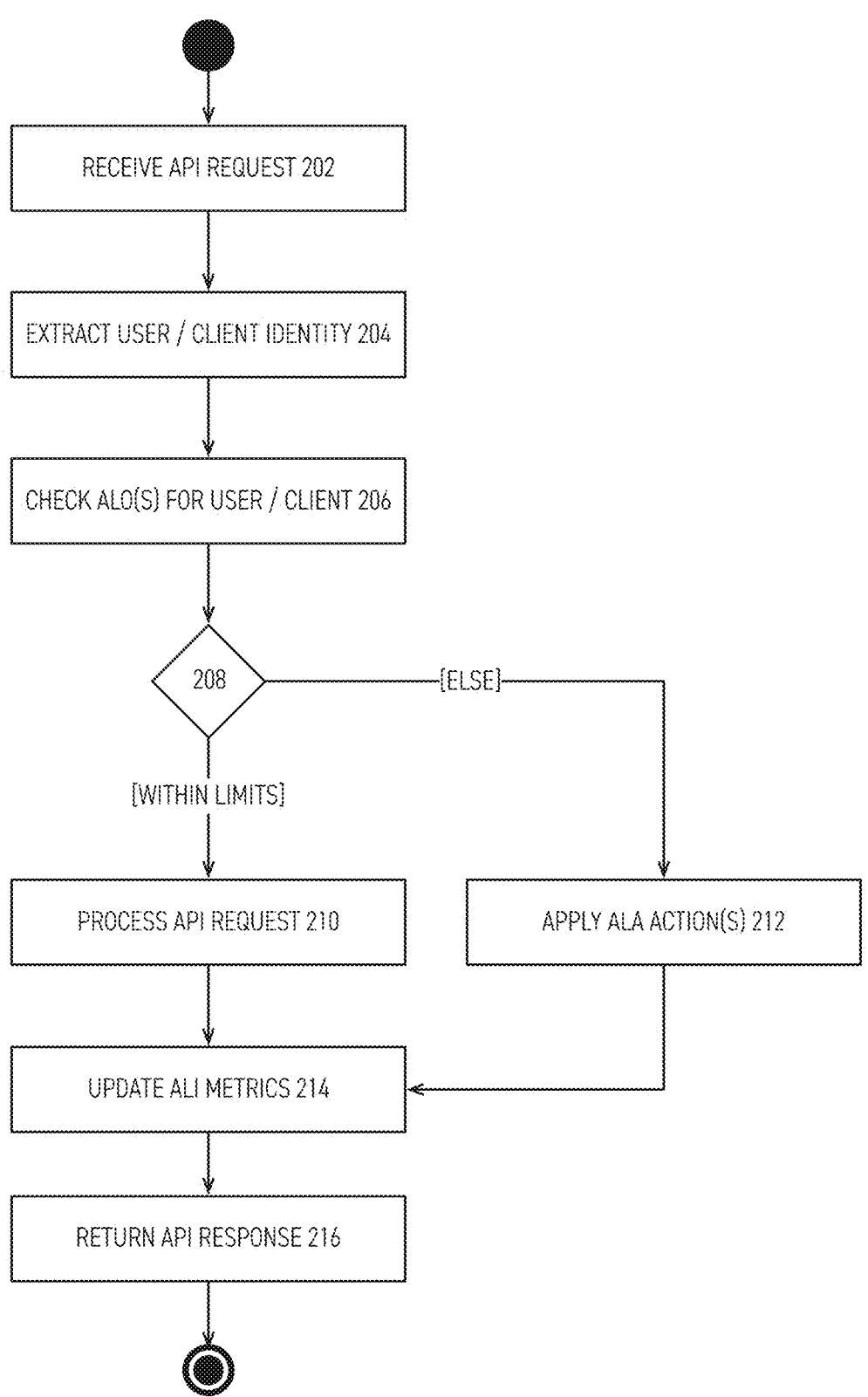
FIG. 2 is a flow diagram illustrating a method for handling an API request according to some of the disclosed embodiments.

FIG. 2 is a flow diagram illustrating a method for handling an API request according to some of the disclosed embodiments.

In step 202, the method can include receiving an API request from an API client. In some implementations, the API request can comprise a network call (e.g., HTTP request) or similar type of network request to access a computing resource.

In step 204, the method can include, upon receiving the request, extracting the user or client identity associated with the request. In some implementations, this identity information is used to determine the applicable API usage policies for the specific user or client. In some implementations, the user or client identity can be extracted from a token, cookie, or other similar type of mechanism for managing requestor identities in a networked API. The extraction of user or client identity allows the method to associate the incoming request with a specific user or client and apply the corresponding policies. The identity information can be obtained from various sources, such as authentication tokens, API keys, or client certificates. The method can integrate with external authentication and authorization systems to validate the identity and retrieve additional metadata about the user or client.

In step 206, once the user or client identity is extracted, the method can include checking the ALOs associated with that identity. As discussed, in some implementations, the ALOs define the acceptable usage limits for a given user or client, such as the maximum number of requests per second, the maximum response size, maximum response bandwidth, or the maximum allowed error rate, etc. In some implementations, the method can retrieve the relevant ALOs from a distributed cache, where they are stored and managed by an ALO manager. In some implementations, the ALO manager is responsible for managing and updating the ALOs based on the defined policies and any dynamic adjustments made by the system administrators or API owners. The method can use the retrieved ALOs to evaluate the usage limits and determine whether the request should be allowed or blocked.

In step 208, the method can then evaluate whether the incoming request falls within the defined limits specified by the ALOs. In some implementations, the method can include comparing the current usage metrics of the user or client against the thresholds defined in the ALOs. In some implementations, the method can maintain a record of the usage metrics for each user or client, which is updated with each incoming request. In some implementations, the method can include comparing the current usage metrics of the user or client against the thresholds specified in the ALOs. This evaluation can take into account various factors, such as the time window for measuring the usage (e.g., per second, per minute, per hour), the specific API endpoint being accessed, and any additional conditions or restrictions defined in the ALOs.

In step 210, if the request falls within the defined limits (as determined in step 208), the method can then proceed to process the API request. In some implementations, this can include forwarding the request to the appropriate backend service based on the API endpoint and any routing rules. In some implementations, the backend service can then process the request and generate a response, which is then sent back to the client via the method. The routing of requests to the backend services can be based on various criteria, such as the API endpoint, the HTTP method, or the request parameters. In some implementations, the method can also perform additional transformations or modifications to the request before forwarding it, such as adding headers, modifying the request payload, or applying security measures.

In step 212, on the other hand, if the request exceeds the defined limits (as determined in step 208), the method can apply the corresponding ALA action. As discussed, ALAs specify the actions to be taken when an ALO is breached. In some implementations, these actions can include throttling the request, rejecting the request with a specific error response, or triggering an alert to notify the system administrators or API owners. In some implementations, the method can retrieve the relevant ALAs from the distributed cache, where they are stored and managed by an ALA manager. The ALAs define the specific actions to be taken in case of a policy violation. These actions can vary based on the severity of the violation and the business requirements. Common ALA actions may include throttling, where the method can limit the rate of requests from the user or client to a predefined threshold, helping to prevent excessive usage and ensure fair allocation of resources among all clients. Another action is rejecting the request with an error response, where the method can reject the request and return an error response to the API client, including a specific status code and a message indicating the reason for the rejection. In some implementations, the method can also generate an alert or notification to inform the system administrators or API owners about the policy violation, allowing for timely intervention and investigation of potential issues or abuse. In severe cases, the method can temporarily or permanently block the user or client from accessing the APIs, an action typically reserved for repeated violations or malicious behavior.

In step 214, after processing the request (step 210) or applying the ALA action (step 212), the method can include updating the ALI metrics associated with the user or client. In some implementations, the ALIs represent the actual usage metrics, such as the number of requests made, the total response size, the response bandwidth, the number of errors encountered, and the latency of the requests. The method can collect these metrics and send them to the ALI manager for storage and analysis. In some implementations, the method collects various metrics for each user or client and sends these metrics to the ALI manager for storage and aggregation. The ALI manager can store the metrics in a distributed cache or similar database.

In step 216, the method can include returning an API response to the API client. If the request was processed successfully, the response can include the requested data or the result of the API operation. If an ALA action was applied, the response may include an error message or a notification indicating the reason for the action, such as exceeding the usage limits. In some implementations, the method can send the response received from the backend services or the error response generated by the ALA action back to the API client. The response can include additional headers or metadata added by the method, such as rate limiting information or cache-control directives.

The illustrated method can ensure that API usage is monitored and controlled based on the defined policies, protecting the backend services from excessive or abusive usage. In some implementations, the method can act as the central point of control and enforcement for API usage policies. In some implementations, the method can intercept every incoming request and applies the necessary checks and actions before forwarding the request to the backend services. This centralized approach allows for consistent and efficient enforcement of policies across all API endpoints and clients.

In some implementations, the collected ALI metrics serve multiple purposes. They provide visibility into the usage patterns and trends of the APIs, enabling the system administrators and API owners to make informed decisions about capacity planning, performance optimization, and policy adjustments. The metrics can also be used for generating reports, dashboards, and analytics to gain insights into the API ecosystem.

The flow diagram in FIG. 2 represents some aspects of the entire API request handling process. In practice, the method can involve additional steps and components, depending on the specific requirements and architecture of the system. Examples of such modifications are provided herein.

For example, the method can perform request validation and payload parsing before extracting the user or client identity in step 204. This step can ensure that the incoming request adheres to the expected format and schema, reducing the risk of processing invalid or malformed requests. The checking of ALOs in step 206 can be extended to include additional policy dimensions, such as API versioning, request payload size, or geographical restrictions. The ALO manager can support a flexible policy definition language that allows for complex and conditional expressions. The processing of the API request in step 210 can involve additional steps, such as request caching, request deduplication, or request fan-out to multiple backend services. The method can also implement various optimization techniques to improve the performance and scalability of the API ecosystem. The updating of ALI metrics in step 214 can be performed asynchronously to minimize the impact on the request-response cycle. The method can buffer the metrics and send them to the ALI manager in batches or through a message queue, ensuring that the metric collection does not introduce significant latency. The API response returned in step 216 can be subject to additional transformations or modifications by the method before being sent back to the API client. This can include response compression, response caching, or response filtering based on the client's permissions or subscription level.

Figure 3:
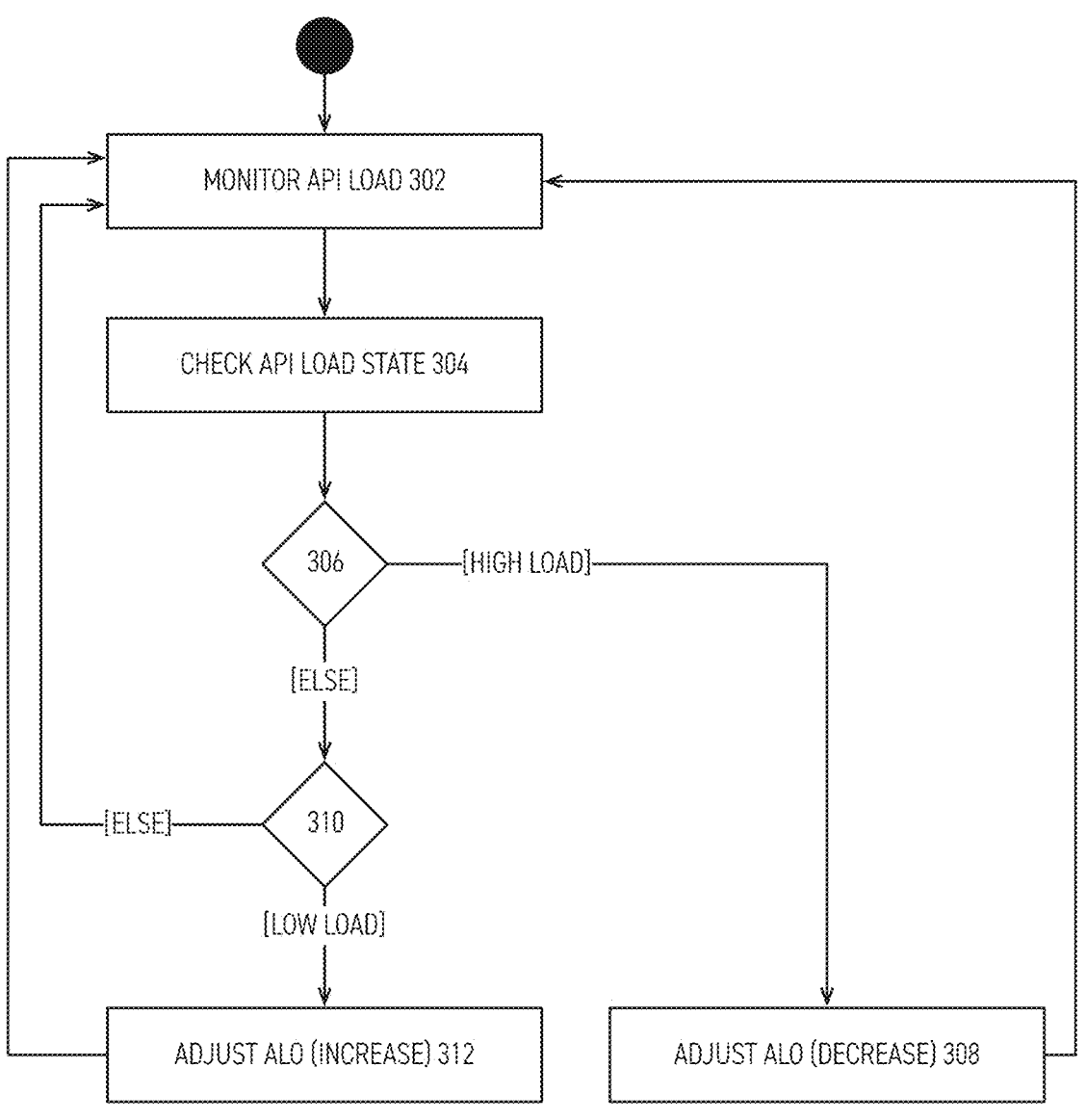
FIG. 3 is a flow diagram illustrating a method for dynamically adjusting API level objectives based on the load state of an API according to some of the disclosed embodiments.

FIG. 3 is a flow diagram illustrating a method for dynamically adjusting API level objectives based on the load state of an API according to some of the disclosed embodiments. In some implementations, the method can include monitoring the load on an API and making corresponding adjustments to the ALOs to ensure optimal performance and resource utilization, described in more detail herein.

In step 302, the method can include monitoring an API load. In some implementations, monitoring the load on the API is performed to ensure that it operates within acceptable performance boundaries and can handle the incoming API traffic effectively. In some implementations, monitoring of the API load can be achieved through various methods, such as collecting performance metrics, analyzing resource utilization, or measuring response times. In some implementations, the method may employ monitoring agents or probes that continuously gather relevant data from the API and send it to a centralized monitoring system for analysis.

In step 304, after collecting the load data, the method can include checking the API load state. In some implementations, the load state represents the current performance and resource utilization levels of the API. The method can analyze the collected metrics and compare them against predefined thresholds or baseline values to determine the load state. In some implementations, the load state can be categorized into different levels, such as high load, normal load, or low load, based on the severity of the resource utilization and performance impact. The categorization of load states may vary depending on the specific requirements and characteristics of the system. In some implementations, load states may be normalized into a known range of numbers (i.e., between 0 and 1, where, for example, 0.00-0.33 represents a low load, 0.34-0.67 represents a medium load, and 0.68-1.00 represents a high load).

In step 306, once the API load state is determined, the method can determine whether the load is considered high. A high load indicates that the API is experiencing significant resource utilization or performance degradation, which may affect its ability to serve API requests efficiently.

In step 308, if the load is determined to be high, the method can proceed to adjust the ALOs by decreasing their values. As discussed, ALOs define the acceptable usage limits for API clients, such as the maximum number of requests per second or the maximum response bandwidth. By decreasing the ALO values, the method effectively reduces the allowed usage limits for API clients. The adjustment of ALOs in step 308 aims to alleviate the high load on the API by controlling the incoming API traffic. By reducing the usage limits, the method can throttle or restrict the number of requests that the API needs to serve, allowing it to recover from the high load state and maintain stable performance. The extent of the ALO adjustment in step 308 can be determined based on predefined rules or algorithms. For example, the method may have a set of predefined adjustment levels that correspond to different load thresholds. Alternatively, the adjustment can be calculated dynamically based on the severity of the high load and historical data on the API performance. After adjusting the ALOs in step 308, the method can continue monitoring the API load to assess the impact of the adjustment and detect any further changes in the load state.

In step 310, if the API load is not considered high, the method can evaluate whether the load is low. Low load indicates that the API may be underutilized or may have excess capacity to handle additional API requests.

In step 312, if the load is determined to be low, the system adjusts the ALOs by increasing their values. Increasing the ALO values allows API clients to make more requests or consume more resources, as the API has the capacity to handle the increased traffic. The adjustment of ALOs in step 312 in the case of low load aims to optimize resource utilization and improve the overall performance of the system. By allowing API clients to make more requests, the method can better utilize the available resources of the API and provide a better user experience. Similar to the decrease adjustment in step 308, the increase adjustment in step 312 can be based on predefined rules or dynamically calculated based on the extent of the low load and historical performance data.

After adjusting the ALOs, the method can continue monitoring the API load to track the impact of the adjustment and identify any subsequent changes in the load state. If the API load is neither high nor low, indicating a normal or acceptable load state (e.g., a medium load), the system continues monitoring the API load without making any adjustments to the ALOs. The system maintains the current ALO values and keeps track of the load state for any potential changes.

The method of monitoring the API load and making adjustments to the ALOs is a continuous cycle. The method can repeatedly check the load state and make necessary adjustments based on the observed load levels. This feedback loop ensures that the ALOs are dynamically adapted to the changing load conditions of the API.

The dynamic adjustment of ALOs based on the API load state offers several technical benefits to API systems. It enables performance optimization by adjusting the ALOs in response to the API load, helping to prevent overloading during high load periods and allowing effective resource utilization during low load periods. It also ensures efficient resource utilization by allowing API clients to consume more resources when the load is low and conserving resources during high load periods. The method can maintain API availability by controlling incoming API traffic based on the load state, preventing the API from becoming overwhelmed and unresponsive. This contributes to the scalability of the system, allowing it to handle varying levels of API traffic without manual intervention. Overall, these dynamic adjustments provide a better user experience for API clients by maintaining stable performance and availability of the API services.

Figure 4:
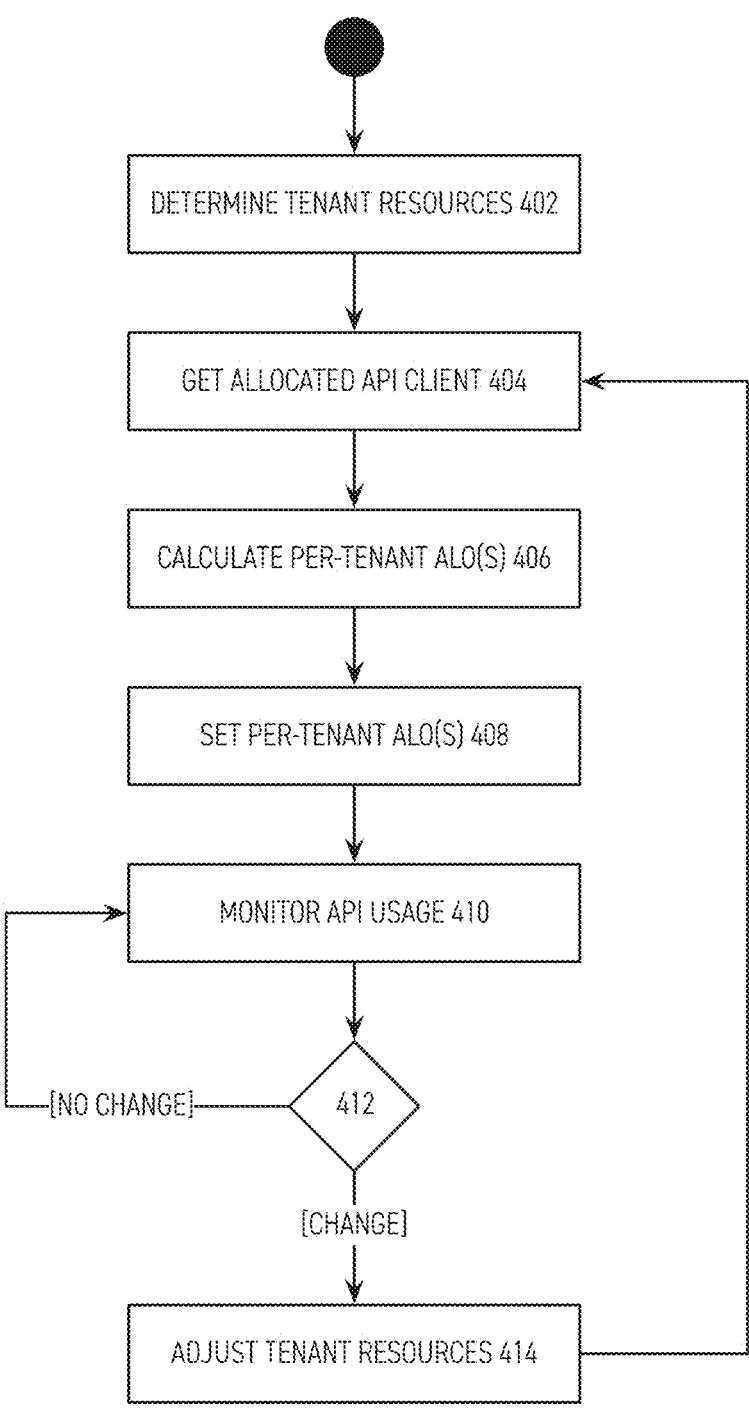
FIG. 4 is a flow diagram illustrating a method for setting and adjusting API level objectives for individual tenants based on their allocated resources according to some of the disclosed embodiments.

FIG. 4 is a flow diagram illustrating a method for setting and adjusting API level objectives for individual tenants based on their allocated resources according to some of the disclosed embodiments. This method can ensure that each tenant receives appropriate ALOs proportional to their allocated resources, enabling fair and efficient utilization of the system's capabilities.

In step 402, the method begins by determining the tenant resources. As discussed above, tenant resources can refer to the number of API instances allocated to each tenant. The allocation of API instances is typically based on factors such as the tenant's service level agreement (SLA), expected API usage, and overall resource requirements. To determine the tenant resources, the method can maintain a mapping between tenants and their allocated API instances. This mapping can be stored in a database or configuration file that keeps track of the tenant-specific resource allocations.

In step 404, the method retrieves the allocated API instance count for each tenant. The method can access the stored mapping information and extracts the number of API instances assigned to each tenant. In some implementations, the API instance count represents the maximum number of concurrent API instances that a tenant can utilize. It can thus determine the tenant's capacity to handle API requests and perform tasks. The API instance count is one factor in setting the ALOs to ensure that tenants receive a fair share of the system's resources. Certainly, other factors (discussed above) may be considered.

In step 406, once the allocated API instance count is obtained, the method can proceed to calculate the per-tenant ALOs. The ALOs define the acceptable usage limits for API clients within each tenant. These limits can include metrics such as the maximum number of requests per second, the maximum response bandwidth, or the maximum allowed error rate. The calculation of per-tenant ALOs involves applying a predefined formula or algorithm that takes into account the allocated API instance count. The formula ensures that tenants with a higher API instance count receive proportionally higher ALOs compared to tenants with a lower API instance count. For example, the formula for calculating the maximum requests per second (RPS) ALO for a tenant could be: Max RPS=Base RPS×API Instance Count. In this formula, the "Base RPS" represents a predefined value that sets the baseline RPS limit per API instance. By multiplying the base RPS by the API instance count, the method can determine the maximum RPS ALO for each tenant. Similar formulas can be applied for other ALO metrics, such as maximum response bandwidth, error rate, etc. The specific formulas and base values may vary based on the system's requirements and performance characteristics.

In step 408, after calculating the per-tenant ALOs, the method sets the ALOs for each tenant. The calculated ALO values are stored in the ALO manager, which is responsible for managing and enforcing the ALOs across the system. The ALO manager maintains a mapping between tenants and their respective ALOs. This mapping allows the gateway to retrieve the appropriate ALOs for each tenant when processing API requests. The ALO manager ensures that the ALOs are consistently applied and enforced throughout the system.

In step 410, once the per-tenant ALOs are set, the method can begin monitoring the API usage for each tenant. The monitoring process involves collecting and analyzing various metrics related to API consumption, such as the number of requests, response bandwidths, error rates, and latency. In some implementations, as API requests pass through the gateway, it captures the relevant metrics and associates them with the corresponding tenant. The captured metrics are then forwarded to the ALI manager for aggregation and analysis. The ALI manager stores the usage metrics in a distributed cache or similar storage mechanism. It provides capabilities for querying, aggregating, and visualizing the usage metrics over different time intervals. The method can continuously monitor the API usage and compare it against the set ALOs for each tenant. This comparison helps in detecting any deviations or breaches of the usage limits defined by the ALOs.

In step 412, periodically, the method can check if the API usage for any tenant has significantly changed. This check involves analyzing the usage metrics collected by the ALI manager and comparing them against predefined thresholds or historical patterns. If the API usage for a tenant has significantly changed, the method can determine if an adjustment of tenant resources is necessary. The decision to adjust tenant resources depends on various factors, such as the magnitude of the usage change, the duration of the change, and the overall system capacity.

In step 414, if the usage change is substantial and persistent, indicating a need for resource adjustment, the method can initiate the process of adjusting the tenant resources. This adjustment typically involves modifying the number of allocated API instances for the tenant. The resource adjustment process may involve several steps, such as evaluating the current usage metrics and projecting future resource requirements based on the observed trends, determining the optimal number of API instances needed to accommodate the changed usage patterns while maintaining the desired performance levels, updating the tenant-resource mapping to reflect the new allocation of API instances, provisioning or deprovisioning API instances as necessary to match the updated allocation, and monitoring the system's performance and resource utilization after the adjustment to ensure stability and effectiveness.

After adjusting the tenant resources, the method goes back to step 404 of retrieving the updated API instance count for the affected tenant(s). This step ensures that the per-tenant ALOs are recalculated based on the new resource allocation. If the API usage for a tenant has not significantly changed, the method can continue monitoring the usage without making any resource adjustments. The monitoring process remains active, continuously collecting and analyzing usage metrics to detect any potential changes or anomalies.

If no significant changes are detected, the method continues monitoring the API usage. The process of monitoring API usage and checking for usage changes is an ongoing cycle. The method can repeatedly perform these steps to ensure that the per-tenant ALOs remain aligned with the actual API usage patterns and resource requirements. By continuously monitoring the API usage and adjusting tenant resources as needed, the method can ensure optimal utilization of the available API instances. It allows the method to dynamically adapt to changing usage patterns and maintain the desired performance levels for each tenant.

Figure 5:
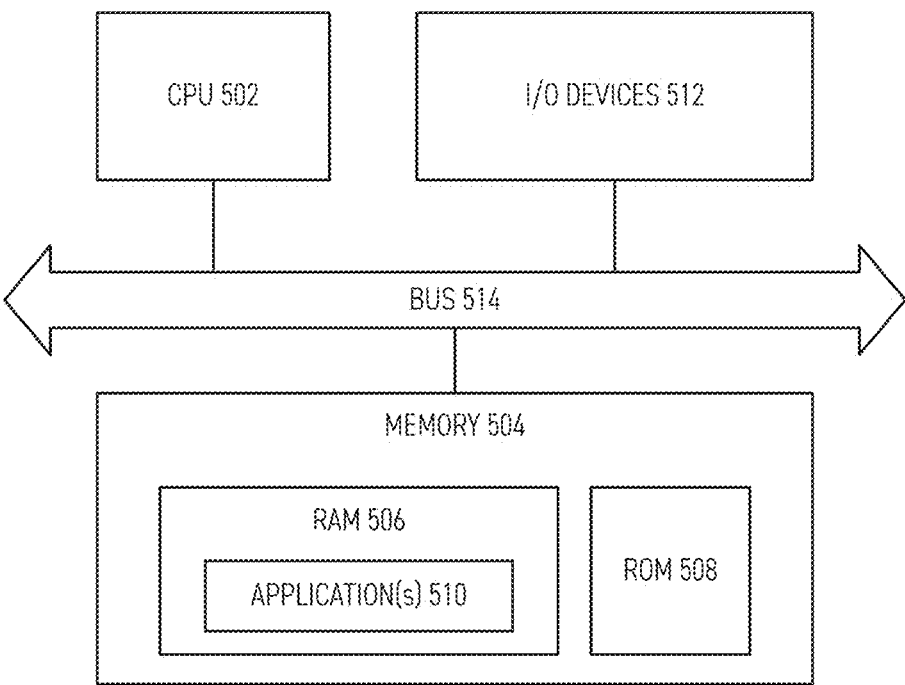
FIG. 5 is a block diagram of a computing device according to some of the disclosed embodiments.

FIG. 5 is a block diagram of a computing device according to some embodiments of the disclosure. In some embodiments, the computing device can be used to perform some or all of the methods described above or implement the components depicted in FIG. 1.

As illustrated, the device includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a non-transitory memory system including a dynamic random-access memory (DRAM), static random-access memory (SRAM), Flash (e.g. NAND Flash), or combinations thereof. In one embodiment, the bus 514 may comprise a Peripheral Component Interconnect Express (PCIe) bus. In some embodiments, bus 514 may comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth™, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving, at an API gateway, an API request from an API client;
   extracting, by the API gateway, a client identity associated with the API request;
   checking, by the API gateway, API Level Objectives (ALOs) associated with the client identity, the ALOs defining acceptable usage limits for the client identity;
   determining, by the API gateway, that the API request falls outside the acceptable usage limits defined by the ALOs; and
   applying, by the API gateway, an API Level Agreement (ALA) action, the ALA action specifying an action to be taken when an ALO is breached.

2. The method of claim 1, extracting the client identity further comprising obtaining identity information from one or more of an authentication token, an API key, or a client certificate associated with the API request.

3. The method of claim 1, checking the ALOs further comprising retrieving, by the API gateway, the ALOs for the client from a distributed cache; and using the retrieved ALOs to evaluate the usage limits for the client.

4. The method of claim 1, determining that the API request falls outside the acceptable usage limits further comprising comparing current usage metrics of the client against thresholds specified in the ALOs.

5. The method of claim 1, processing the API request further comprising forwarding the API request to an appropriate backend service based on an API endpoint and routing rules defined in the API gateway.

6. The method of claim 1, applying the ALA action further comprising one or more of: throttling the API request to limit a rate of requests from the client to a predefined threshold, rejecting the API request and returning an error response indicating a reason for rejection, triggering an alert including a policy violation, or blocking the client from submitting future API requests.

7. The method of claim 1, further comprising: updating API Level Indicator (ALI) metrics associated with the client, the ALI metrics representing one or more of actual usage metrics including a number of requests made, a total response bandwidth, a number of errors encountered, and a latency of the requests; and storing the ALI metrics in a distributed cache for monitoring and analyzing API usage.

8. A non-transitory computer-readable storage medium for tangibly storing computer program instructions capable of being executed by a computer processor, the computer program instructions defining steps of:
   receiving, at an API gateway, an API request from an API client;
   extracting, by the API gateway, a client identity associated with the API request;
   checking, by the API gateway, API Level Objectives (ALOs) associated with the client identity, the ALOs defining acceptable usage limits for the client identity;
   determining, by the API gateway, that the API request falls outside the acceptable usage limits defined by the ALOs; and
   applying, by the API gateway, an API Level Agreement (ALA) action, the ALA action specifying an action to be taken when an ALO is breached.

9. The non-transitory computer-readable storage medium of claim 8, extracting the client identity further comprising obtaining identity information from one or more of an authentication token, an API key, or a client certificate associated with the API request.

10. The non-transitory computer-readable storage medium of claim 8, checking the ALOs further comprising retrieving, by the API gateway, the ALOs for the client from a distributed cache; and using the retrieved ALOs to evaluate the usage limits for the client.

11. The non-transitory computer-readable storage medium of claim 8, determining that the API request falls outside the acceptable usage limits further comprising comparing current usage metrics of the client against thresholds specified in the ALOs.

12. The non-transitory computer-readable storage medium of claim 8, processing the API request further comprising forwarding the API request to an appropriate backend service based on an API endpoint and routing rules defined in the API gateway.

13. The non-transitory computer-readable storage medium of claim 8, applying the ALA action further comprising one or more of: throttling the API request to limit a rate of requests from the client to a predefined threshold, rejecting the API request and returning an error response indicating a reason for rejection, triggering an alert including a policy violation, or blocking the client from submitting future API requests.

14. The non-transitory computer-readable storage medium of claim 8, the steps further comprising: updating API Level Indicator (ALI) metrics associated with the client, the ALI metrics representing one or more of actual usage metrics including a number of requests made, a total response bandwidth, a number of errors encountered, and a latency of the requests; and storing the ALI metrics in a distributed cache for monitoring and analyzing API usage.

15. A device comprising:

a processor; and a non-transitory computer-readable medium storing program instructions that, when executed by the processor, cause the processor to perform steps of:

receiving, at an API gateway, an API request from an API client;

extracting, by the API gateway, a client identity associated with the API request;

checking, by the API gateway, API Level Objectives (ALOs) associated with the client identity, the ALOs defining acceptable usage limits for the client identity;

determining, by the API gateway, that the API request falls outside the acceptable usage limits defined by the ALOs; and applying, by the API gateway, an API Level Agreement (ALA) action, the ALA action specifying an action to be taken when an ALO is breached.

16. The device of claim 15, extracting the client identity further comprising obtaining identity information from one or more of an authentication token, an API key, or a client certificate associated with the API request.

17. The device of claim 15, checking the ALOs further comprising retrieving, by the API gateway, the ALOs for the client from a distributed cache; and using the retrieved ALOs to evaluate the usage limits for the client.

18. The device of claim 15, determining that the API request falls outside the acceptable usage limits further comprising comparing current usage metrics of the client against thresholds specified in the ALOs.

19. The device of claim 15, processing the API request further comprising forwarding the API request to an appropriate backend service based on an API endpoint and routing rules defined in the API gateway.

20. The device of claim 15, applying the ALA action further comprising one or more of: throttling the API request to limit a rate of requests from the client to a predefined threshold, rejecting the API request and returning an error response indicating a reason for rejection, triggering an alert including a policy violation, or blocking the client from submitting future API requests.

* * * * *